United States Patent
Chen

(10) Patent No.: US 6,941,491 B2
(45) Date of Patent: Sep. 6, 2005

(54) METHOD OF DEBUGGING USING A USB CONNECTING SYSTEM

(75) Inventor: Song Bor Chen, Taipei (TW)

(73) Assignee: Inventec Corporation, Taipei (TW)

( * ) Notice: Subject to any disclaimer, the term of this patent is extended or adjusted under 35 U.S.C. 154(b) by 610 days.

(21) Appl. No.: 10/073,205

(22) Filed: Feb. 13, 2002

(65) Prior Publication Data

US 2003/0154429 A1 Aug. 14, 2003

(51) Int. Cl.[7] .............................................. G06F 11/32
(52) U.S. Cl. ........................................ 714/25; 714/46
(58) Field of Search ......................... 714/43, 46, 57, 714/25

(56) References Cited

U.S. PATENT DOCUMENTS 5,850,562 A * 12/1998 Crump et al. .................. 713/1
6,336,195 B1 * 1/2002 Shen et al. ..................... 714/34
6,560,702 B1 * 5/2003 Gharda et al. .................. 713/2
6,615,288 B1 * 9/2003 Herzi .......................... 710/10
6,732,301 B1 * 5/2004 Landry et al. ................. 714/43

* cited by examiner

Primary Examiner—Scott Baderman
Assistant Examiner—Anne L Damiano
(74) Attorney, Agent, or Firm—Jacobson Holman PLLC

(57) ABSTRACT

A method of debugging using a USB connecting system. A debug signal function is installed in the BIOS of a target PC, and a host PC is provided with monitor software. A USB interface is used to connect the target PC and the host PC, using the host PC to monitor the debugging state of the BIOS of the target PC. The invention thus achieves the goal of debugging a system through a USB.

9 Claims, 3 Drawing Sheets

METHOD OF DEBUGGING USING A USB CONNECTING SYSTEM

BACKGROUND OF THE INVENTION

1. Field of Invention

The invention relates to a system debug method and, in particular, to a method used in a computer system for debugging the system through a USB (universal serial bus).

2. Related Art

In the modern world, more and more functions are provided in information processing systems. Therefore, debugging becomes increasingly difficult when problems occur to the system. During the developing phase of a system program or when the system is out of order, debugging is then extremely messy for programmers or ordinary users.

To avoid any possible bugs from occurring for the information processing system to function correctly, any abnormal phenomenon has to be monitored and corrected so that no serious consequences will happen in the information processing system. Conventional programmers or ordinary users have to search for bugs by trials when the system has errors. This often wastes a lot of time and efforts.

To solve the above-mentioned problem, various kinds of debuggers are used as programming tools to help debugging. However, these methods require expensive devices, such as the ICE (in-circuit emulator). This will greatly increase the cost. Another method is to use an I/O (input/output) port connecting to a decoding circuit for debugging. Though the cost of the later method is lower, it is nevertheless very inconvenient because an extra connecting circuit is needed.

From the above description, one sees that currently available debugging utilities are either too costly or too inconvenient in practice. Therefore, it is highly desirable to provide a debugging utility that is both convenient and cheap.

SUMMARY OF THE INVENTION

The invention provides a method of debugging a system through a USB (universal serial bus), and one of whose objectives is to use a USB connecting a host PC and a target PC to monitor the debugging job.

The disclosed method debugs the target PC from the host PC. First, the target PC is provided with a debug port and program code and the host PC is installed with monitor software. The host PC monitors the debugging state of the BIOS (basic input/output system) of the target PC. A USB interface connects the target PC and the host PC, achieving the objective of debugging the system through the USB.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
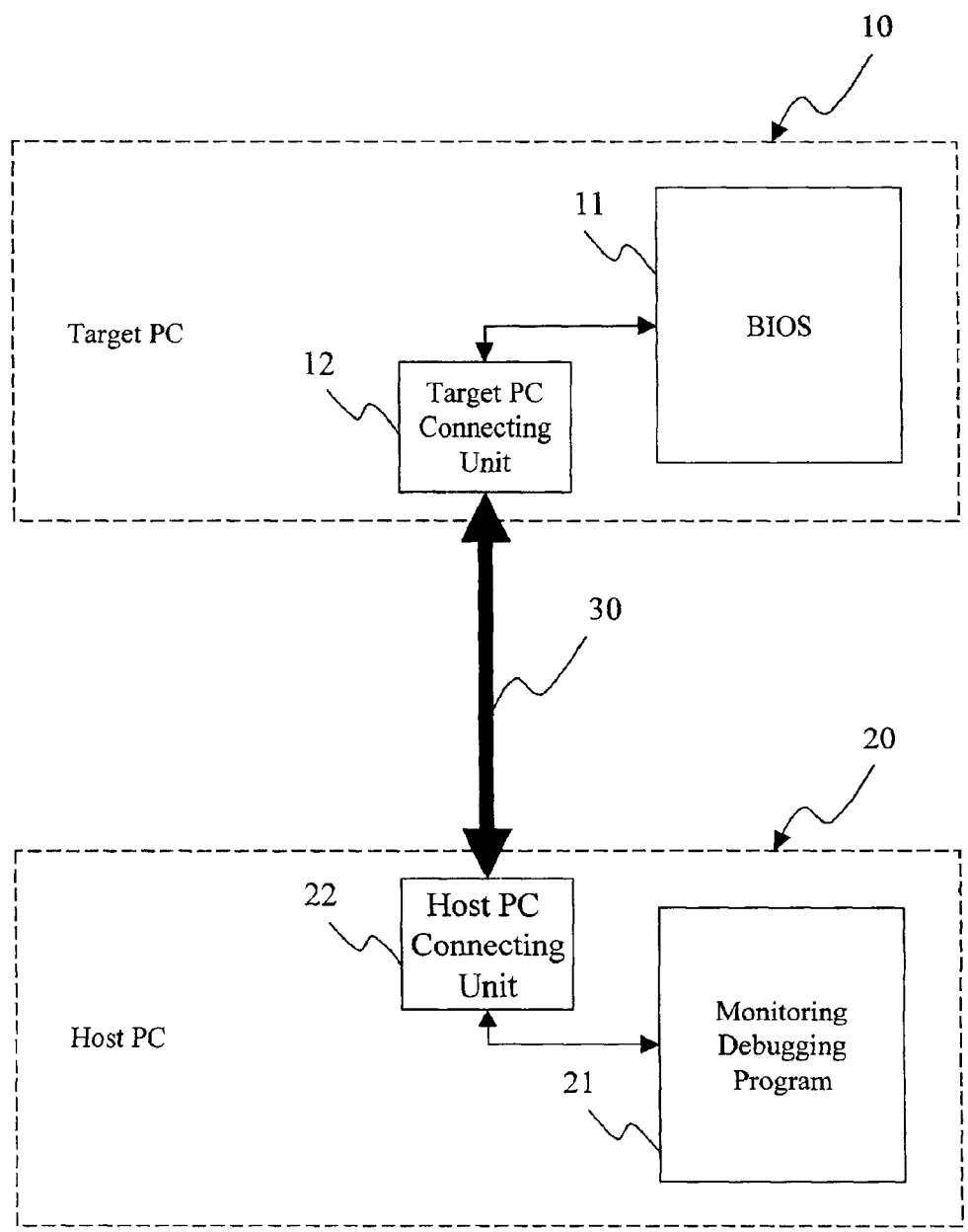
FIG. 1 shows the system structure of the disclosed method.

With reference to FIG. 1, the computer systems connected through the USB includes a target PC 10 and a host PC 20. The target PC 10 is the computer system that performs debugging, and the host PC 20 is the computer system that monitors the debugging message. The target PC 10 contains a BIOS 11 and a target PC connecting unit 12. The host PC 20 contains a Monitoring Debugging Program 21 and a host PC connecting unit 22.

First, the BIOS 11 of the target PC 10 is provided with the function of outputting debug signals. That is, the program code with the function of outputting debug signals is added into the BIOS 11 when making the BIOS firmware of the system. The host PC 20 is installed with the Monitoring Debugging Program 21. A transmission unit 30 is provided to connect the target PC 10 and the host PC 20.

Both the target PC connecting unit 12 and the host PC connecting unit 22 are USB ports. The transmission unit 30 is a USB cable. In addition to the function of outputting debug signals, the BIOS 11 is further installed with a flow control flag to control the function. The flow control flag can be set as 0 or 1 by the user, controlling whether the Monitoring Debugging Program should keep running.

Figure 2:
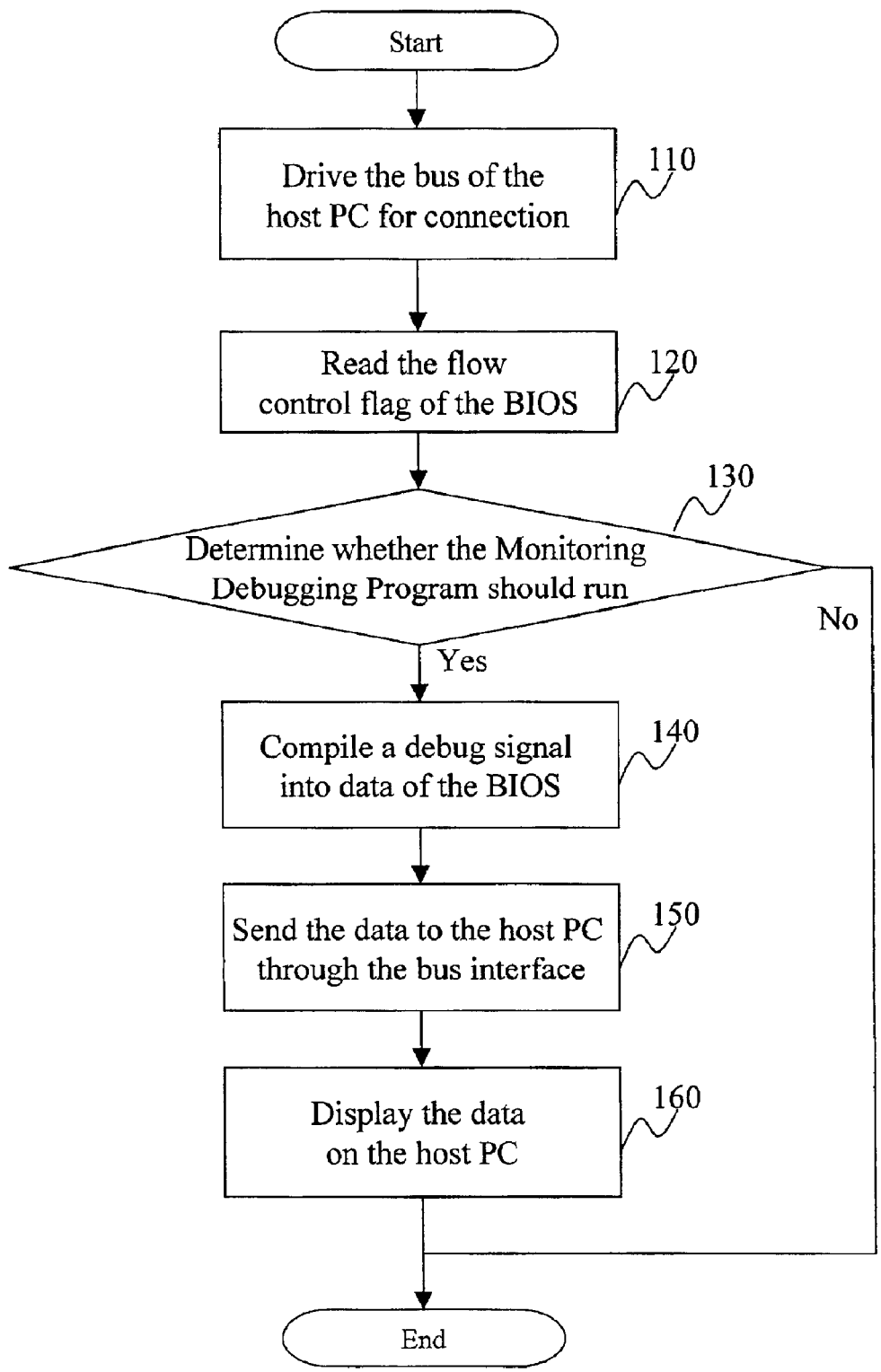
FIG. 2 is a flowchart of the first embodiment of the invention.

The description of the disclosed method is detailed as follows. With reference to FIG. 2, step 110 first drives a bus of a host PC for connection. Step 120 reads the flow control flag of the BIOS. Step 130 determines whether the Monitoring Debugging Program should be executed. If the flow control flag indicates not to run the Monitoring Debugging Program, then the target PC does not compile the program code of the debug signal outputting function into the BIOS. If the flow control flag indicates to run the Monitoring Debugging Program, the target PC compiles the debug signal into data in the BIOS (step 140). Step 150 then sends the BIOS data to the host PC through the bus. Finally, the data are displayed on the host PC in step 160 for the user at the host PC to monitor the debugging state of the BIOS of the target PC.

Figure 3:
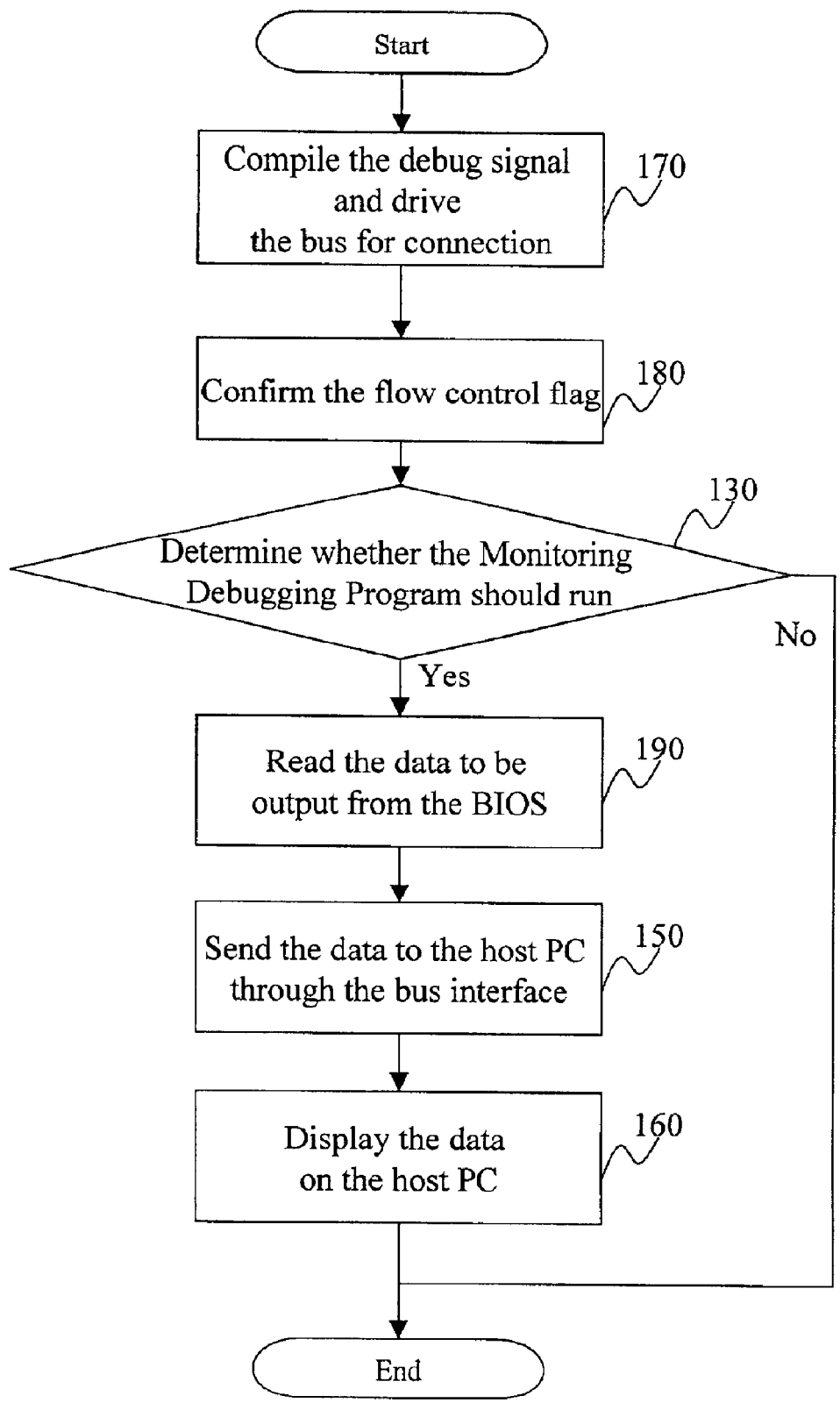
FIG. 3 is a flowchart of the second embodiment of the invention.

Another example is given below to illustrate a second embodiment of the invention. As shown in FIG. 3, step 170 compiles a debug signal and drives a bus for connection. A target PC confirms the flow control flag in step 180, determining whether the Monitoring Debugging Program should be executed (step 130). If the flow control flag indicates not to run the Monitoring Debugging Program, then the target PC does not output the debug signal to the host PC. If the flow control flag indicates to run the Monitoring Debugging Program, the target PC sends out the debug signal and reads data to be output from the BIOS (step 190). The data already contain the debug signal. The data are sent to the host PC through a bus interface (step 150). The bus interface is a USB interface. Finally, the data are displayed on the host PC (step 160) for the user to monitor the debug state of the BIOS of the target PC.

The BIOS in the above two embodiments may further have the functions of initializing the USB controller of the target PC and sending data to the host PC through the USB port.

EFFECTS OF THE INVENTION

Using the disclosed technique, a target PC can performs debugging with the use of a USB cable. Therefore, the computer system debugging does not need expensive utilities and becomes more efficient.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A debugging method using a USB (universal serial bus) connecting system for debugging a target PC from a host PC, which comprises the steps of:

driving a USB interface to connect the target PC and the host PC through the USB connecting system;

reading a flow control flag of a BIOS and detecting the value of the flow control flag;

compiling a program code with the function of outputting a debug signal into data of the BIOS of the target PC;

outputting the data through a transmission unit; and displaying the data on a screen of the host PC wherein if the flow control flag indicates not to perform debugging in the step of detecting the value of the flow control flag, the program code with the function of outputting the debug signal does not compile into the BIOS.

2. The method of claim 1, wherein the flow control flag is set by a user to have a value selected from 0 and 1 to determine whether debugging should be monitored.

3. The method of claim 1, wherein the data further contain the program code with the function of outputting the debug signal.

4. The method of claim 1, wherein the BIOS further executes the steps of:

initializing a USB controller of the target PC; and outputting the data to the host PC through a connecting unit.

5. The method of claim 1, wherein the transmission unit is a USB cable for connecting the host PC and the target PC.

6. The method of claim 1, wherein the host PC further contains a USB port connecting to the USB cable.

7. The method of claim 1, wherein the target PC further contains a USB port connecting to the USB cable.

8. The method of claim 1, wherein the target PC is a computer system that performs debugging.

9. The method of claim 1, wherein the host PC is a computer system that monitors the program code with the function of outputting the debug signal.

* * * * *